United States Patent Office 2,941,520
Patented June 21, 1960

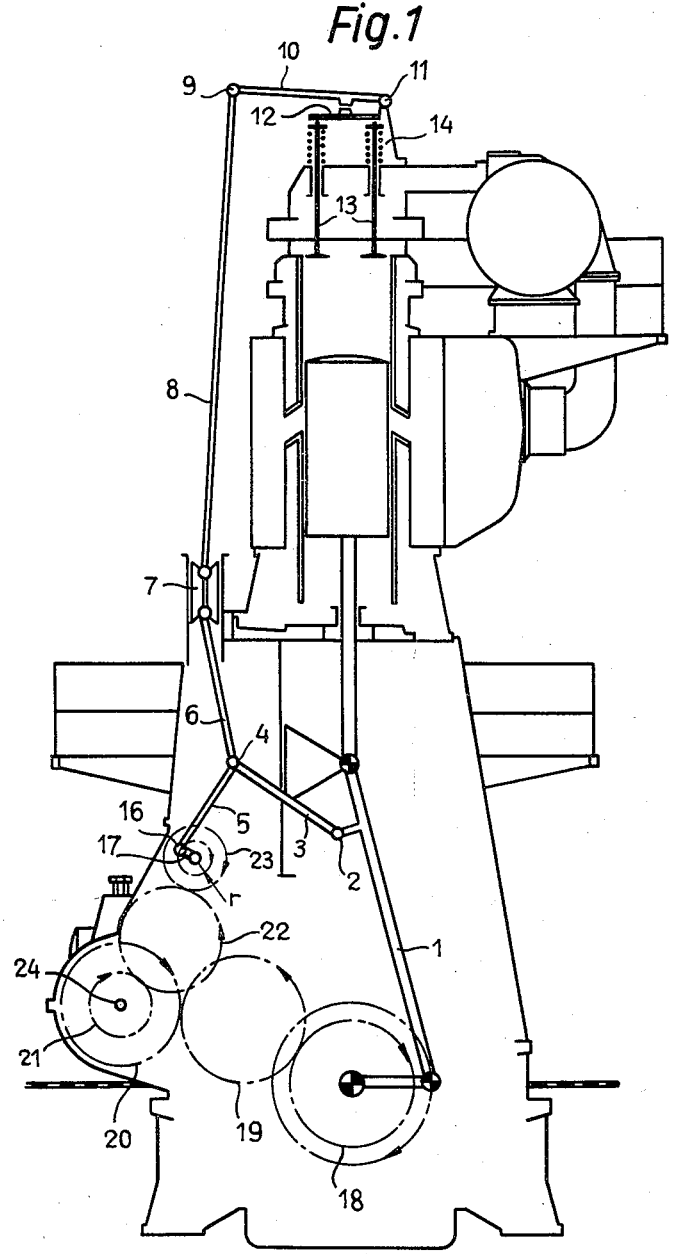

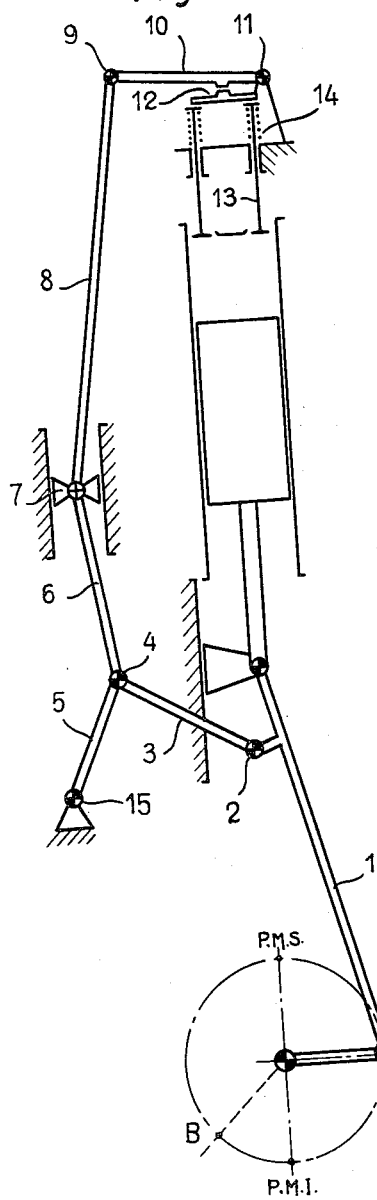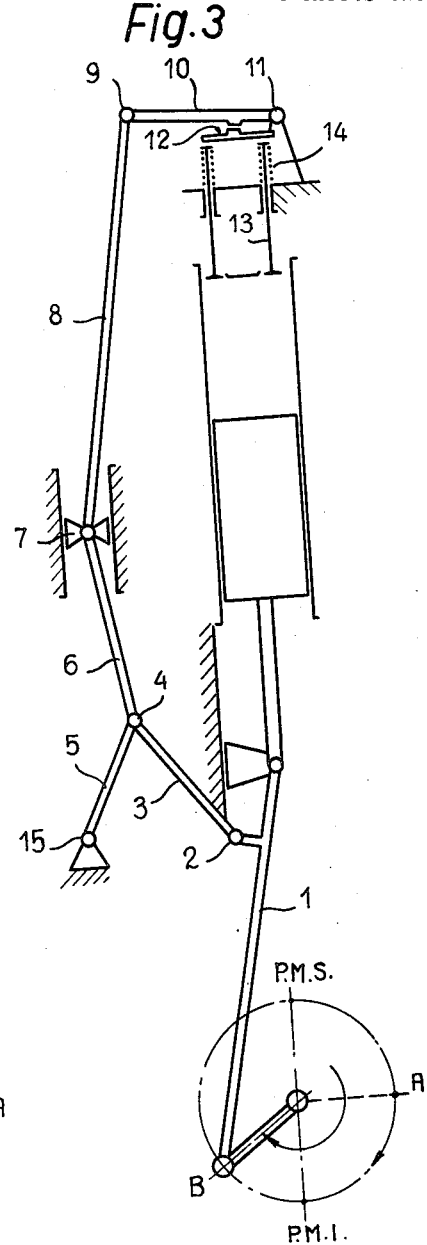

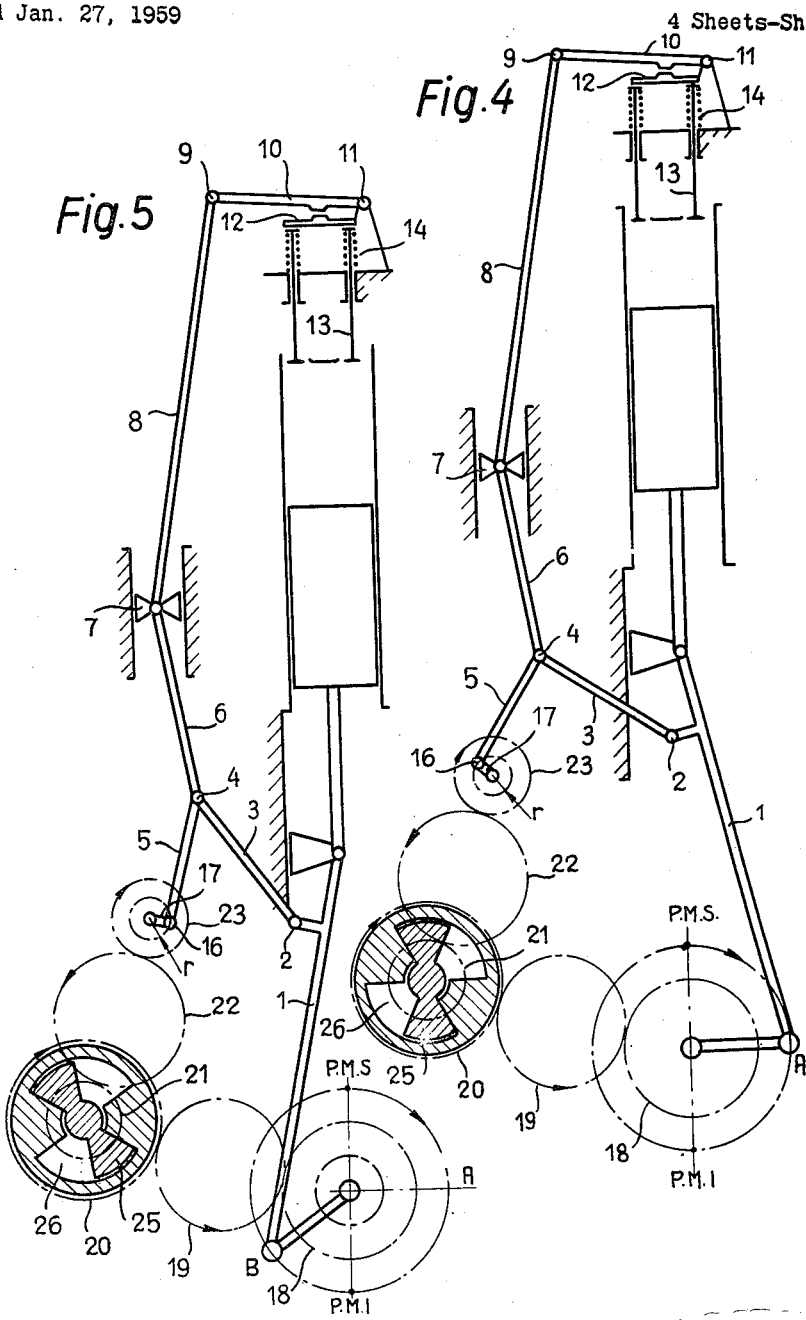

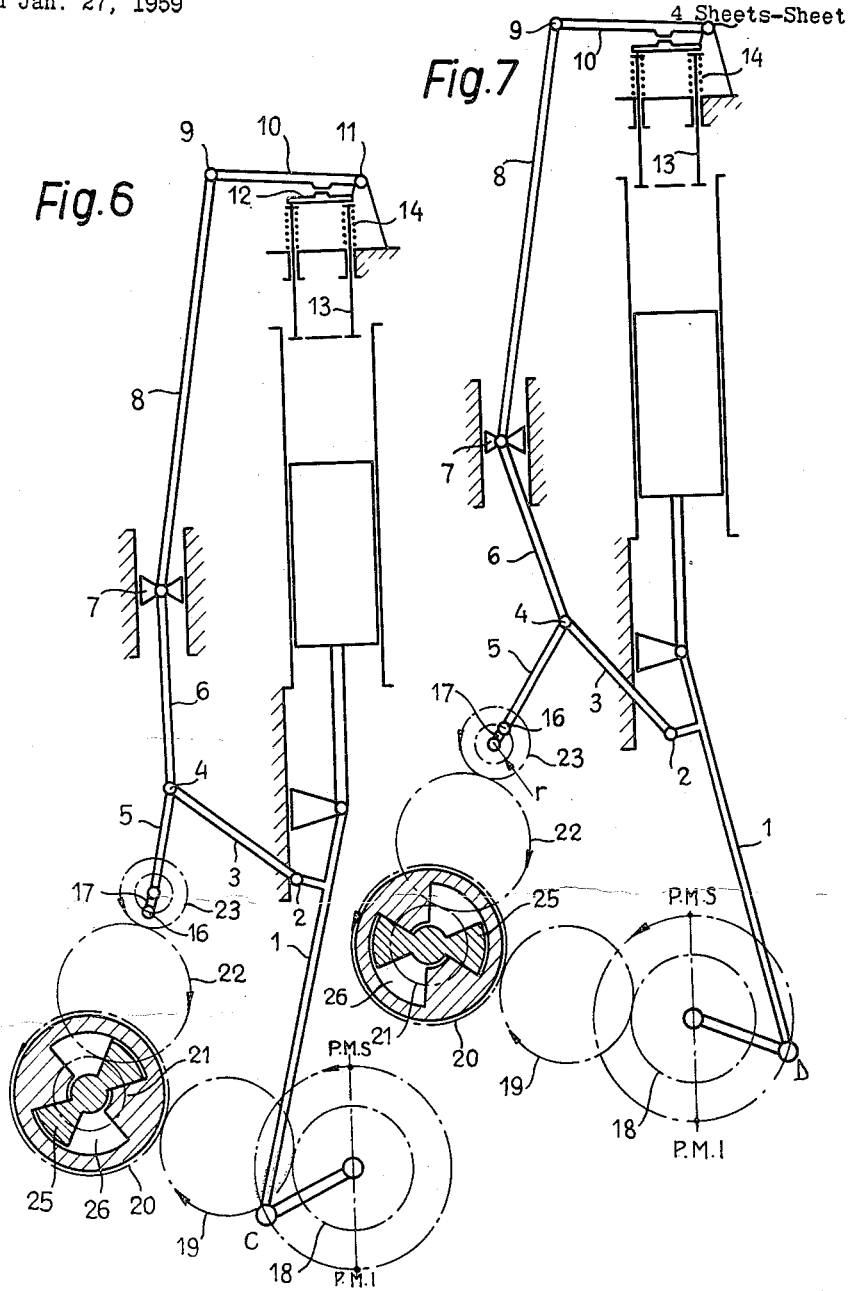

2,941,520
VALVE GEAR FOR TWO-STROKE ENGINE EXHAUST VALVES

Adriano Zucchi, Turin, Italy, assignor to Fiat Societa per Azioni, Turin, Italy

Filed Jan. 27, 1959, Ser. No. 789,369

Claims priority, application Italy Nov. 8, 1958

2 Claims. (Cl. 123—41)

This invention relates to a valve gear for exhaust valves on two stroke engines, more particularly large-sized engines with overhead valves and one-way scavenging.

A valve gear for overhead valves of the conventional type on large-sized two stroke engines would be expensive on account of the large size of the controls for valve tappets, more particularly the gears transmitting motion from the engine shaft to the camshaft, and of the camshaft itself.

Moreover, in such controls the springs acting on the exhaust valves should operate the rocking levers and valve tappets also, so that the springs should be made of such size as to balance at the same time the inertia forces of the said component parts. In large-sized engines such springs should be made of very considerable size, which is difficult to carry out in practice.

This invention provides a valve gear for two-stroke engine exhaust valves, which obviates the above mentioned disadvantages.

The improved device comprise exclusively mutually articulated links and levers, actuated by the driving connecting rod both during opening and closing of the valves.

According to an embodiment of this invention, a first link is articulated to the connecting rod, the intermediate links are arranged laterally of the cylinder, and the last link provides a lever acting on the valves to open them at a desired portion of the piston stroke, allowing the valves to close under the action of the springs during an initial portion of the upward piston stroke.

Further characteristic features of this invention will be understood from the appended detailed description referring to the accompanying drawings, which diagrammatically show by way of a non-limiting example some embodiments thereof.

Figure 1 is a diagrammatical elevational view of the device in connection with a large-sized two-stroke engine with overhead valves and one-way scavenging.

Figures 2 and 3 are similar views showing the operation of the device as the valves start opening and complete closing, respectively, in a non-reversible engine.

Figures 4 and 5 are similar views showing operation of the device in connection with a reversible engine during forward drive, whereas Figures 6 and 7 show operation of the device according to Figures 4 and 5 during reverse.

Referring to Figure 1, 1 denotes the driving connecting rod carrying in proximity to its articulation to the piston rod and laterally off-set a pivot 2 having articulated thereto a first link 3 associated with a leverage comprising further links 5, 6, 8 and 10. The link 5 is laterally arranged and is articulated at 4 to the links 3 and 6 in a star-arrangement.

The links 6 and 8 are in turn articulated to a shoe 7 which is guided in a direction parallel with the piston axis. The links 8 and 10 are articulated to each other at 9. The link 10 is pivoted to a stationary pivot 11 and acts as a lever of the second order through a beam 12 on the stems of the valves 13 arranged in the cylinder head.

In non-reversible engines (Figures 2 and 3) the lateral link 5 is capable of oscillation about a stationary reference pivot 15, while in reversible engines (Figures 4 to 7) the link 5 is pivoted at 16 to a crank 17 having a radius $r$ of rotation driven through a gear system from the camshaft controlling the injection pumps. The camshaft, which is denoted by 24 in Figure 1, receives motion in a manner known per se from the driving shaft through gears 18, 19 and 20 and transmits rotation to the crank 17 through gears 21, 22 and 23.

A reversing gear 25—26 is interposed in a manner known per se between the gears 20 and 21 coaxial with shaft 24 for the purpose of suitable mutual adjustment of the angular position of the driving crank and crank 17 on reversal of the engine rotation.

The link 6 performs a complex movement resulting from the motions imparted to links 3 and 5 connected thereto at 4; the link 8 moves substantially parallel with the cylinder axis, while the link 10 swings about the fulcrum 11. The link 10 is held apart from the beam 12 leaving the stems of the valves 13 unaffected during the full period of the engine cycle exclusive of the exhaust stroke.

In non-reversible engines (Figures 2 and 3) the link 10 comes into contact with the beam 12 starting opening of the valves 13 as soon as the articulation of the connecting rod 1 to the crank reaches position A in Figure 2 by clockwise rotation. The valves 13 are held open till the said articulation of the connecting rod and crank reaches position B in Figure 3. Beyond the latter position the link 10 is removed from the cross member 12 and the valves 13 are closed.

Springs 14 acting on the valves 13 effect closing of the valves only, the links of the system being actuated by the driving connecting rod direct both toward the open and closed position of the valves.

Asymmetry of the opening diagram of the exhaust valves with respect to the lower dead point may be adjusted by properly positioning the articulation 2 between the connecting rod 1 and the first link 3 of the system. By modifying in addition to the location of the articulation 2 the length of the links 3, 4 and 5 the period of the exhaust stroke can be modified at will within very wide limits and the valve lift law can be modified as well.

Referring to Figures 4 and 5 relating to a forward drive of a reversible engine, the end of the lateral link 5 is articulated at 16 to the crank 17, which rotates synchronously with the engine shaft. During reverse drive, reversal of the engine shaft and camshaft 24 controlling the injection pumps reverses the direction of rotation of the crank 17 too.

During this reversal the angular positions of the driving crank and crank 17 are displaced, for the projections 25 perform a part idle run between the seats 26 over a predetermined angular width in order to effect the said angular displacement.

Therefore, the exhaust valves start opening at the position denoted by C in Figure 6, closing of the valves being completed at the position denoted by D in Figure 7.

Adjustment of the crank 17 is selected to cause opening of the exhaust valves to start and closing thereof to be modified during reverse at positions of the crank denoted by C and D, respectively, in Figure 6, which are further advanced over the positions obtainable if the above angular displacement had not taken place during reversal of the engine shaft.

During forward drive the angular adjustment of the crank 17 is such as to move the link 5 upwardly when the articulation between the connecting rod and driving crank is about to reach position A at which the valves start opening. This assists in reducing the downward oscillational speed of the link 10 as the latter is about to engage the stems of the valves 13 through the beam 12. The result is a reduced impact speed on the valve stems. On further rotation beyond this position crank 17 lowers the link 5 in the same direction as the connecting rod 1, which results in quick opening of the exhaust valves.

The links 3 and 5 may conveniently have conduits bored therein for circulation of lubricating oil towards the connecting rod 1.

With the above described device, the various cylinders of the engine are made independent of one another as far as valve gear is concerned, each connecting rod operating the exhaust valves of its respective cylinder.

It will be understood that the principle of the invention being left unaltered, embodiments and constructional details may be widely varied from the example described and shown without departing from the scope of this invention.

What I claim is:

1. In an internal combustion two-stroke reciprocating engine having a crankshaft, a connecting rod and an overhead exhaust valve, a valve gear for the exhaust valve comprising a shoe slidable in a direction generally parallel with the cylinder axis of the engine, a valve-actuating lever having one end pivotally connected to the engine head, a pull-rod connecting the opposite end of the valve-actuating lever to the shoe thereby to open the valve on pulling the pull-rod from the shoe, a reversing crank having a pin, a reversing gearing coupling the reversing crank with the crankshaft thereby to rotate the reversing crank in a timed relation with the crankshaft, a link extending from the shoe towards the said pin, and a pair of further links connecting the free end of the said link to the pin and an intermediate point of the connecting rod, respectively.

2. In an internal combustion engine as claimed in claim 1 the said intermediate point laterally off-set with respect to the connecting rods axis.

References Cited in the file of this patent

UNITED STATES PATENTS 350,200    Humes  ---------------- Oct. 5, 1886

FOREIGN PATENTS 20,983    Great Britain ---------- July 10, 1913
420,032    Great Britain ---------- Nov. 23, 1934